July 2, 1974 1 T. O. CASPERSSON ET AL Re. 28,062

APPARATUS FOR PHOTOMETRIC ANALYSIS INCLUDING MEANS FOR SCANNING

Original Filed March 8, 1971

INVENTORS

TORBJÖRN OSKAR CASPERSSON

GÖSTA MATTIAS LOMAKKA

BY Kenway, Jenney & Hildreth

ATTORNEYS

United States Patent Office

Re. 28,062
Reissued July 2, 1974

28,062

APPARATUS FOR PHOTOMETRIC ANALYSIS INCLUDING MEANS FOR SCANNING

Torbjörn Oskar Caspersson, Stockholm, and Gösta Mattias Lomakka, Sollentuna, Sweden, by Incentive Research and Development AB, Bromma, Sweden, assignee Original No. 3,711,209, dated Jan. 16, 1973, Ser. No. 121,814, Mar. 8, 1971. Application for reissue June 4, 1973, Ser. No. 366,867
Claims priority, application Sweden, Mar. 9, 1970, 3,114/70
Int. Cl. G01n *21/30*
U.S. Cl. 356—203 4 Claims

Matter enclosed in heavy brackets [ ] appears in the original patent but forms no part of this reissue specification; matter printed in italics indicates the additions made by reissue.

ABSTRACT OF THE DISCLOSURE

A photometric analysis of a specimen is carried out by means of a scanning and integrating apparatus which comprises a main phototube, a specimen holder, driving means for producing relative movement between the main phototube and the specimen holder in accordance with a predetermined scanning path, and an integrator for integrating the electrical output signal from the main phototube. A diaphragm has an aperture which represents a predetermined measuring field. Lamp and lens means are provided for producing an image of the aperture. An auxiliary phototube is provided for registering said image. The driving means are arranged to actuate members for producing a relative movement between said image and said auxiliary phototube, and said relative movement is in accordance with the predetermined scanning path. The auxiliary phototube actuates an electronic gate which switches off the signal from the main phototube to the integrator when the auxiliary phototube does not receive any light from the image of the aperture.

Our U.S. Pat. No. 3,446,562 discloses a method and an apparatus for the photometric analysis of a specimen, in which the specimen is scanned in a predetermined scanning course or path covering a scanning area of a considerably larger size than the size of the specimen. It is a characteristic feature of this known method that the scanning movement shall be transferred to a light-spot on the screen of a cathode ray tube, and that said light-spot shall be registered by means of an auxiliary phototube.

It has been found that said known method and apparatus involves some disadvantages. For example, if the scanning area is very small, the transfer of the scanning movement to the light-spot on the screen of the cathode ray tube is comparatively complicated. The movements of the specimen are very small, and it is very complicated to sense said small movements and to transfer them to the cathode ray tube by means of position-sensing transducers and amplifiers.

It is the main object of the invention to prvide a less complicated method and apparatus for photometric analysis. It is a particular object of the invention to substitute a simple mechanical device for the cathode ray tube of the known apparatus.

The method of the invention is characterized in providing an illuminated aperture of a diaphragm, said aperture representing a measuring field lying within the scanning area, scanning said aperture, by means of an auxiliary phototube, with a scanning movement which is in accordance with the scanning movement of the specimen, and making the output signal from said auxiliary phototube switch on and switch off the photometric analysis, so that only the area within the measuring field is analyzed.

The apparatus of the invention comprises a main phototube, a specimen holder, driving means for producing a relative movement between the main phototube and the specimen holder in accordance with a predetermined scanning path, and an integrator for integrating the electrical output signal from the main phototube, and is characterized by a diaphragm having an aperture representing a predetermined measuring field, lamp and lens means for producing an image of the aperture, an auxiliary phototube for registering the image of the aperture, members operated by the driving means to produce a relative movement between the image of the aperture and the auxiliary phototube, said relative movement being in accordance with the predetermined scanning path, and an electronic gate, operated by the auxiliary phototube to switch off the signal from the main phototube to the integrator when the auxiliary phototube does not receive any light from the image of the aperture.

In a preferred embodiment the means for producing a movement of the image of the aperture of the diaphragm relative to the auxiliary phototube comprises two mirrors situated in the path of light between the aperture of the diaphragm and the auxiliary phototube, said mirrors being rotatably mounted and having their axes of rotation oriented at right angles to each other. Each of said axes of rotation is mechanically connected to one of the two driving members which produce the desired scanning movement of the specimen holder. In this way the diaphragm may be stationary, whereas the image of the aperture of the diaphragm can be moved relative to the auxiliary phototube by means of the mirrors.

The invention will be described below with reference to the accompanying drawing which illustrates how the invention can be used in a microphotometer.

Figure 1:
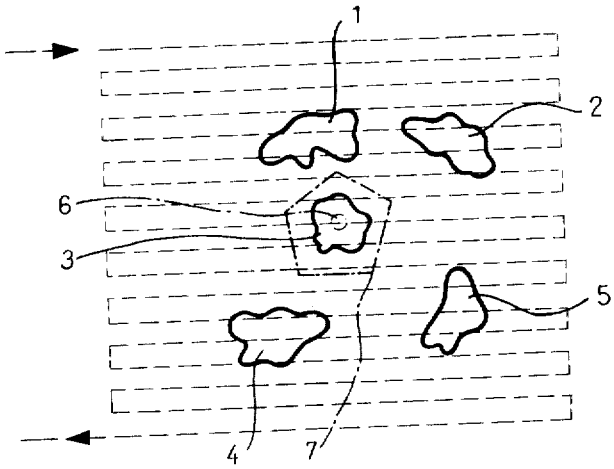
FIG. 1 shows a specimen to be analyzed, a diaphragm for the delimitation of the specimen, and the scanning course as followed in the photometric analysis.

FIG. 1 shows a magnified image of a specimen consisting of five cells 1–5 from a human tissue, for instance. It is desired to analyze cell No. 3 to find out the quantity of light-absorbing substance in said cell. This is done by passing a light beam through the cell and analyzing the absorption of the light beam in the cell, the degree of absorption representing the quantity of light-absorbing substance. If, for instance, the light is monochromatic and has a wave length of 2,650 Angstrom units, the absorption represents the quantity of nucleic acids in the cell. It is preferred, for the sake of convenience, to measure the transmission in lieu of the absorption. The transmission T is:

$$T=10^{-k.c.d.}$$

wherein c.d. is the quantity of light-absorbing substance per unit of area. Consequently, the transmission is an exponential function of the quantity of light-absorbing substance. The light-absorbing substance is not evenly distributed in the cell. Therefore, it is not possible to measure the transmission in one single measurement by means of a light-beam covering the whole cell. It is necessary to measure on a small area in which the light-absorbing substance is likely to be evenly distributed, and to move said measuring area so as to cover the entire area of the cell, and to integrate the results of said measurements over the entire cell area. FIG. 1 illustrates such a small measuring area 6. In the analysis of cells it has been found that the measuring area should preferably have a diameter of approximately 1 micron. This measuring area 6 is moved in a scanning course as indcated by the dotted line.

FIG. 1 also illustrates the contour 7 of the desired measuring field. The measuring field delimits the cell 3 from the other cell in the scanning area. It is desired that measuring shall take place only when the measuring area 6 is within the contour 7. How this is done will be explained with reference to FIGS. 2 and 3.

Figure 2:
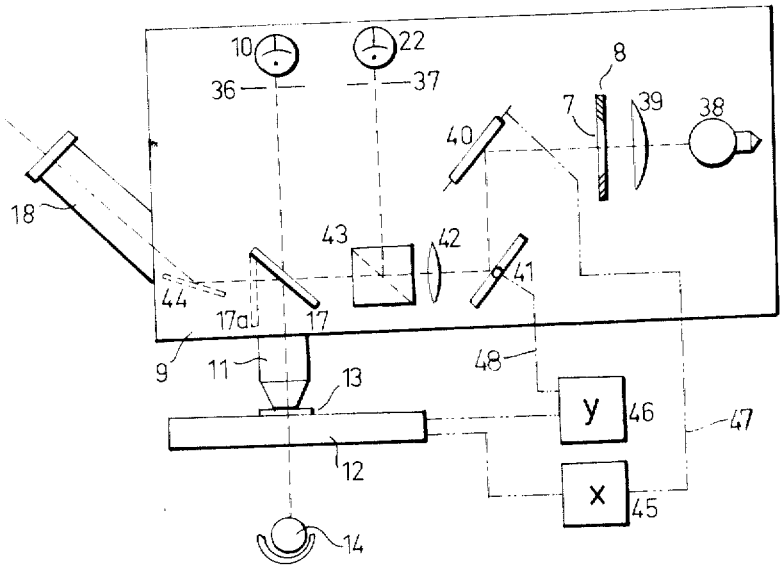
FIG. 2 shows a microphotometer having an apparatus according to the invention.

The apparatus disclosed in FIG. 2 comprises a microscope 9 having below its objective 11 a holder 12 for a specimen 13. A light-source 14 sends a light-beam through the specimen 13 and the objective 11 to a main phototube 10 which measures the intensity of the light-beam. The specimen holder 12 can be moved in two directions, perpendicular to each other, by means of driving members 45, 46, so as to perform the scanning movement represented by a dotted line in FIG. 1.

The apparatus also contains a diaphragm 36, which is situated below the main phototube 10, and which defined the size of the measuring area. If the desired diameter of the measuring area is 1 micron, and if the magnification is 100, the diaphragm 36 shall have an aperture having a diameter of 0.1 mm.

The apparatus also contains an optical-mechanical device consisting of a lamp 38 which illuminates a diaphragm 8 through a collecting lens 39. The aperture 7 of the diaphragm has a contour corresponding to the desired contour of the measuring area. A lens 42 produces an image of the aperture 7 in the image plane of the eye-piece 18. The light from the aperature 7 to the lens 42 is reflected in two rotatable mirrors 40, 41. The mirror 40 has its axis of rotation situated in the plane defined by the drawing, whereas the mirror 41 has its axis of rotation situated at right angles to said plane. Preferably, both mirrors are oriented to change the direction of the light by 90°. Having passed through the lens 42 the light is split up in light-splitting member 43, to the effect that part of the light travels through the opening of a diaphragm 37 to an auxiliary phototube 22, and part of the light travels through a semi-transparent mirror 17 to the eye-piece 18. The operator can now see, in the eye-piece 18, an image of the specimen 13 and a superimposed image of the aperture 7. The driving members 45, 46 for the specimen holder 12 are also connected to the mirrors 40, 41 so as to rotate said mirrors in such a direction and at such a rate of gear that the images produced in the eye-piece 18 of the specimen 13 and the aperture 7 accompany each other. Consequently, the aperture 7 can be considered to perform a scanning movement relative to the auxiliary phototube 22 which is in accordance with the scanning movement of the specimen 13 relative to the phototube 10. The lens 42 produces a real image of the aperture 7 in the plane of the diaphragm 37. The aperture of the diaphragm 37 is of a size equal to that of the diaphragm 36.

During a measuring operation the semi-transparent mirror 17 is in the position 17a. The plane of the diaphragm 36 now contains an image of the specimen 13, and the plane of the diaphragm 37 contains an image of the aperture 7. These two images move synchronously during the scanning operation. The main phototube 10 measures the intensity of the light from the current area of the image of the specimen. Simultaneously, the auxiliary phototube 22 receives information whether or not the measured value of said area is to be registered, depending on whether or not the image of the aperture 7 covers the aperture of the diaphragm 37.

Figure 3:
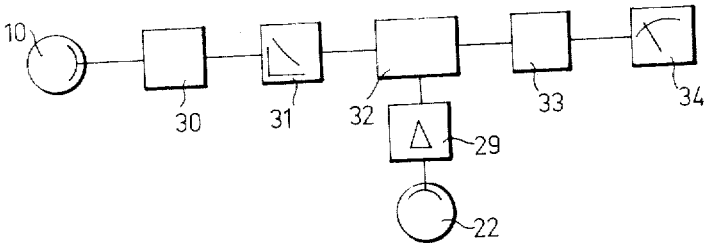
FIG. 3 shows the electric circuit of the apparatus disclosed in FIG. 2.

FIG. 3 illustrates the electrical circuit. The output signal from the main phototube 10 is transmitted through an amplifier 30 to a logarithmic amplifier 31, in which it is transformed logarithmically in a way known per se, to make its intensity directly proportional to the quantity of light-absorbing substance in the measuring area 6. After having been thus transformed logarithmically, the output signal is transmitted through an electronic gate 32 to an integrator 33 in which it is integrated over the whole field to be measured, in a way known per se. The gate 32 is opened and closed by means of the output signal from the auxiliary phototube 22. This output signal is amplified in an amplifier 29. The gate 32 is opened when the auxiliary phototube 22 receives light from the image of the aperture 7. If such light does not reach the auxiliary phototube 22, the gate 32 will be closed. The result will be indicated by an instrument 34. This result will respond to the total quantity of light-absorbing substance in the field to be measured, defined by the aperture 7.

The specimen 13 and the aperture 7 are simultaneously visible in the eye-piece 18 when the semi-transparent mirror is in the position 17. Therefore, the position of the diaphragm 8 and the specimen 13 can be adjusted before starting the measuring process. It is easy to place the specimen 13 in such a position, and to give the aperture 7 such a size and shape, that the desired portion of the image of the specimen (in this particular case the image of the cell 3) lies within the image of the aperture 7. During the measuring process the images of the specimen 13 and the aperture 7, respectively, will be situated upon the diaphragms 36 and 37, respectively. The position of the aperture in the diaphragm 36 upon the image of the specimen will exactly correspond to the position of the aperture in the diaphragm 37 upon the image of the aperture 7. In the very moment when the measuring area 6 reaches the contour 7, that is leaves the desired measuring field, the image of the aperture 7 will no longer cover the aperture 37. Consequently, no light reaches the auxiliary phototube 22. The output signal from the auxiliary phototube 22 will actuate the gate 32 to the effect that the gate switches off the connection between the main phototube 10 and the integrator 33. When the measuring area 6 again comes within the predetermined measuring field, light will again reach the auxiliary phototube 22, to the effect that the gate will switch on the connection between the main phototube 10 and the integrator 33.

The illustrated apparatus operates satisfactorily when the mirrors 40, 41 are turned a small angle only. A simple modification makes it possible to move the image of the aperture along a straight line, without any distortion, also when turning the mirrors in a larger turning angle. In this modified embodiment also the mirror 40 must have its axis of rotation situated at right angles to the plane defined by the incident light, in the same way as the mirror 41. In order to make the image perform two movements at right angles to each other, the planes of incidence of the two mirrors must define an angle of 90°. The term "plane of incidence" relates to the plane defined by the incident and the reflected light. This means that the light beam leaving the mirror 40 must be oriented at right angles to the plane defined by the drawing illustrating FIG. 2. In order to direct said light beam towards the mirror 41 a stationary mirror has to be inserted between the mirrors 40 and 41 to deviate the light beam by 90°.

What is claimed is:

1. A scanning and integrating apparatus for the photometric analysis of a specimen, comprising a main phototube (10), a specimen holder (12), driving means (45, 46) for producing a relative movement between the main phototube (10) and the specimen holder (12) in accordance with a predetermined scanning path, and an integrator (33) for integrating the electrical output signal from the main phototube (10), a diaphragm (8) having an aperture (7) representing a predetermined measuring field, lamp and lens means (38, 39, 42) for producing an image of the aperture (7), an auxiliary phototube (22) for registering the image of the aperture (7), light displacing members (40, 41) operated by the driving means (45, 46) to produce a relative movement between the image of the aperture (7) and the auxiliary phototube (22), said relative movement being in accordance with the predetermined scanning path, and an electronic gate (32), operated by the auxiliary phototube (22), to switch off the signal from the main phototube (10) to the integrator (33) when the auxiliary phototube (22) does not receive any light from the image of the aperture (7).

2. An apparatus as claimed in claim 1, characterized in that the light displacing members (40, 41) consist of two mirrors situated in the path of light between the aperture (7) and the auxiliary phototube (22), said mirrors being rotatably mounted and having their axes of rotation oriented at right angles to each other.

3. A scanning and integrating apparatus for the photometric analysis of a specimen, comprising a main phototube (10), a microscope (11), a holder (12) for the specimen (13), a first light-source (14) for sending a light-beam through said specimen and said microscope to said main phototube (10), an integrator (33) for integrating the electrical output signal from said main phototube (10), a recorder (34) for receiving the output signal from said integrator (33), driving means (45, 46) for moving the specimen holder (12) in a predetermined scanning path covering a predetermined scanning area, an auxiliary phototube (22), a diaphragm (8) having an aperture (7) defining a predetermined measuring field within the scanning area, a second light-source (38) for sending a light-beam through said aperture (7) to said auxiliary phototube (22), mirror means (40, 41) mounted in the path of light between said aperture (7) and said auxiliary phototube (22), said mirror means being actuated by said driving means (45, 46) to displace the light-beam along a path corresponding to said scanning path, and an electronic gate (32) for receiving the output signal from said auxiliary phototube (22) and to switch off the connection between said main phototube (10) and said recorder (34) when said auxiliary phototube (22) does not receive any light from said second light-source (38).

4. A scanning and integrating apparatus for the photometric analysis of a specimen, comprising a main phototube (10), a microscope (11), a holder (12) for the specimen (13) a first light-source (14) for sending a light-beam through said specimen (13) and said microscope (11) to said main phototube (10), an integrator (33) for integrating the electrical output signal from said main phototube (10), a recorder (34) for receiving the output signal from said integrator (33), driving means (45, 46) for moving the specimen holder (12) in a predetermined scanning path covering a predetermined scanning area, said driving means comprising a first driving member (45) to move the specimen holder (12) in a first direction, and a second driving member (46) to move the specimen holder (12) in a second direction, an auxiliary phototube (22), a diaphragm (8) having an aperture (7) defining a predetermined measuring field within the predetermined scanning area, a second light-source (38) for sending a light-beam through said aperture (7) to said auxiliary phototube (22), a first mirror (40) mounted rotatably in the path of light between said aperture (7) and said auxiliary phototube (22), means (47) connecting said first driving member (45) with said first mirror (40) to turn said first mirror so as to displace the light-beam from the second light-source (38) to the auxiliary phototube (22) in a first direction corresponding to the movement in the first direction of said specimen holder (12), means (48) connecting said second driving member (46) with said second mirror (41) to turn said second mirror so as to displace the light-beam from the second light-source (38) to the auxiliary phototube (22) in a second direction corresponding to the movement in the second direction of said specimen holder (12), and an electronic gate (32) for receiving the output electrical signal from said auxiliary phototube (22) and to switch off the electrical connection between said main phototube (10) and said recorder (34) when said auxiliary phototube (22) does not receive any light from said second light-source (38).

References Cited

The following references, cited by the Examiner, are of record in the patented file of this patent or the original patent.

UNITED STATES PATENTS

| | | | |
|---|---|---|---|
| 2,059,221 | 11/1936 | Fessenden | 350—7 |
| 2,932,392 | 4/1960 | Burtner et al. | 250—217 CR |
| 3,446,562 | 5/1969 | Caspersson et al. | 356—226 |

RONALD L. WIBERT, Primary Examiner

F. L. EVANS, Assistant Examiner

U.S. Cl. X.R.

250—219 FR